United States Patent
Liu et al.

(10) Patent No.: US 12,556,700 B2
(45) Date of Patent: Feb. 17, 2026

(54) ADAPTIVE MINIMUM QUANTIZATION PARAMETER FOR VIDEO ENCODING

(71) Applicant: ATI Technologies ULC, Markham (CA)

(72) Inventors: Dong Liu, Markham (CA); Haibo Liu, Markham (CA); Jin Li, Markham (CA)

(73) Assignee: ATI Technologies ULC, Markham (CA)

( * ) Notice: Subject to any disclaimer, the term of this patent is extended or adjusted under 35 U.S.C. 154(b) by 160 days.

(21) Appl. No.: 18/612,567

(22) Filed: Mar. 21, 2024

(65) Prior Publication Data

US 2025/0301138 A1 Sep. 25, 2025

(51) Int. Cl.
| | |
|---|---|
| *H04N 7/12* | (2006.01) |
| *H04N 19/124* | (2014.01) |
| *H04N 19/14* | (2014.01) |
| *H04N 19/172* | (2014.01) |
| *H04N 19/176* | (2014.01) |

(52) U.S. Cl.
CPC ........... *H04N 19/124* (2014.11); *H04N 19/14* (2014.11); *H04N 19/172* (2014.11); *H04N 19/176* (2014.11)

(58) Field of Classification Search
CPC .................................................. H04N 19/124
See application file for complete search history.

(56) References Cited

U.S. PATENT DOCUMENTS

2005/0207501 A1* 9/2005 Auyeung ............ H04N 19/124
375/E7.165

* cited by examiner

*Primary Examiner* — Y Lee
(74) *Attorney, Agent, or Firm* — Volpe Koenig

(57) ABSTRACT

A technique is provided. The technique includes receiving encoder settings; determining a minimum quantization parameter ("QP") for a frame based on the encoder settings; and encoding the frame based on the minimum QP. In some examples, the encoder settings include items such as a target bitrate, a frame rate, and a resolution of a video to be encoded. In some examples, the minimum quantization parameter is a cap on what quantization parameter can be assigned to a block. In some examples, the minimum quantization parameter is affected by these settings as the minimum quantization parameter can be considered to set a maximum amount of data to be used to encode a block, and the amount of data afforded to a block is affected by the encoder settings described above.

20 Claims, 4 Drawing Sheets

ADAPTIVE MINIMUM QUANTIZATION PARAMETER FOR VIDEO ENCODING

BACKGROUND

Video encoding is the process of compressing video for transmission and storage. Advances in this area are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique is provided. The technique includes receiving encoder settings; determining a minimum quantization parameter ("QP") for a frame based on the encoder settings; and encoding the frame based on the minimum QP. In some examples, the encoder settings include items such as a target bitrate, a frame rate, and a resolution of a video to be encoded. In some examples, the minimum quantization parameter is a cap on what quantization parameter can be assigned to a block. In some examples, the minimum quantization parameter is affected by these settings as the minimum quantization parameter can be considered to set a maximum amount of data to be used to encode a block, and the amount of data afforded to a block is affected by the encoder settings described above.

Figure 1:
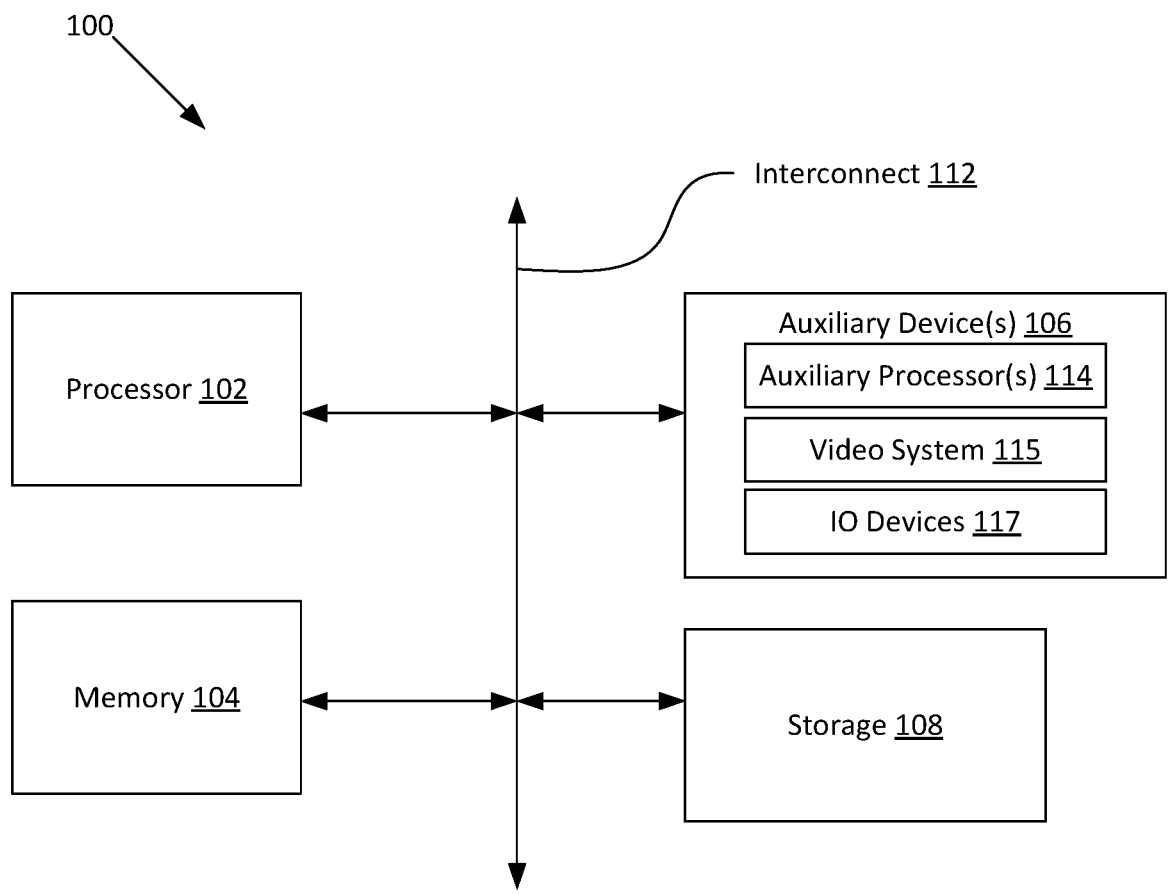
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 include a video system 115. The video system 115 includes one or both of a video encoder or a video decoder. In various examples, the video system 115 is implemented partially or fully in hardware (e.g., using circuitry such as a programmable processor and/or fixed-function circuitry), partially or fully in software executing on a processor, or as a combination there. Additional disclosure about the encoder and decoder are provided elsewhere herein, such as with reference to FIGS. 2A and 2B.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2A:
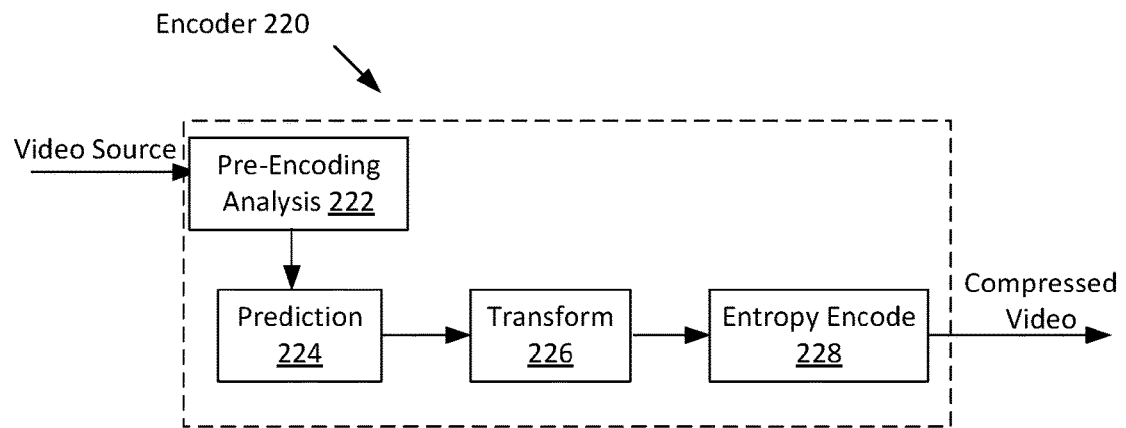
FIG. 2A presents a detailed view of a video encoder, according to an example.

FIG. 2A presents a detailed view of a video encoder 220, according to an example. The video encoder 220 accepts source video, encodes the source video to produce compressed video (or "encoded video"), and outputs the compressed video. Implementations of the encoder 220 may include blocks other than those shown. The encoder 220 includes a pre-encoding analysis block 222, a prediction block 224, a transform block 226, and an entropy encode block 228. In some alternatives, the encoder 220 implements one or more of a variety of known video encoding standards (such as MPEG2, H.264, or other standards), with the prediction block 224, transform block 226, and entropy encode block 228 performing respective portions of those standards. In other alternatives, the encoder 220 implements a video encoding technique that is not a part of any standard. In various examples, the encoder 220 includes and/or communicates with a memory that stores data for frames being encoded. The data stored includes any combination of data input by or output by the encoder 220.

The prediction block 224 performs prediction techniques to reduce the amount of information needed for a particular frame. Various prediction techniques are possible. One example of a prediction technique is a motion prediction based inter-prediction technique, where a block in the current frame is compared with different groups of pixels in a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with a score deemed to be the "best," such as by having the lowest sum of absolute differences, is deemed to be a match. After finding a matching block, the current block is subtracted from the matching block to obtain a residual. The residual is further encoded by the transform block 526 and the entropy encode block 228 and the block is stored as the encoded residual plus the motion vector in the compressed video.

The transform block 226 performs an encoding step which is typically lossy, and converts the pixel data of the block into a compressed format. An example transform that is typically used is a discrete cosine transform (DCT). The discrete cosine transform converts the block into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coefficients. A lower QP requires more bits to store, because more bits are needed for the larger number of available coefficient values, and a lower QP requires fewer bits. Visually, a higher QP is associated with less detail and a lower QP is associated with more detail. Although the concept of QP is defined herein, the term "quality value" is sometimes used herein to generally refer to a value indicating the amount of data afforded for encoding a block, and thus the visual quality with which a block is represented in the encoded video. Numerically, quality value can be thought of as a ranking. Thus, a higher quality value means that a block is afforded a lower number of bits and is thus encoded with lower quality and a lower quality value means that a block is afforded a higher number of bits and is thus encoded with higher quality. It should be understood that although quality values are described herein as a "ranking" (with a lower number meaning higher quality and a higher number meaning lower quality), it is possible for other types of quality values to be used. For example, it is possible to use quality values where a higher number means a higher quality and a lower number means a lower quality. In some situations, the term quantization parameter is used herein. Any instance of that term can be replaced with the term "quality value."

The entropy encode block 228 performs entropy coding on the coefficients of the blocks. Entropy coding is a lossless form of compression. Examples of entropy coding include context-adaptive variable-length coding and context-based adaptive binary arithmetic coding. The entropy coded transform coefficients describing the residuals, the motion vectors, and other information such as per-block QPs are output and stored or transmitted as the encoded video.

The pre-encoding analysis block 222 performs analysis on the source video to adjust parameters used during encoding. One operation performed by the pre-encoding analysis block includes analyzing the source video to generate information for use by the rate control QP setting, which determines what QPs should be afforded to the blocks for encoding. Additional details about determining QPs for encoding blocks are provided below.

Figure 2B:
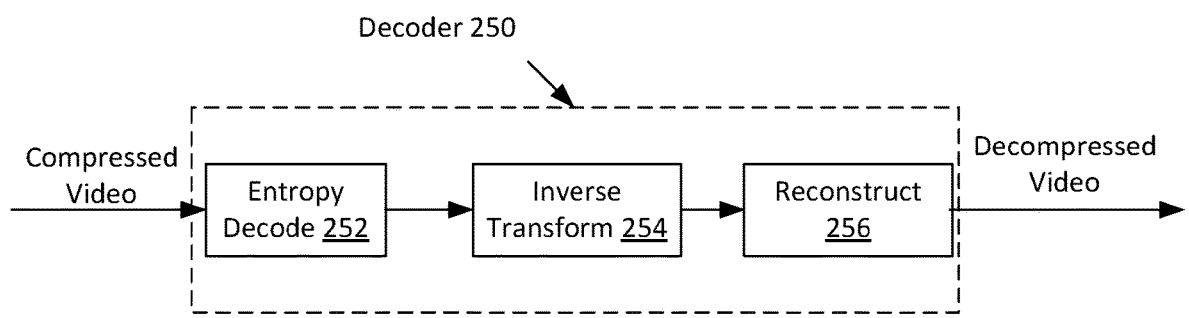
FIG. 2B represents a decoder for decoding compressed data generated by an encoder such as the encoder, according to an example.

FIG. 2B represents a decoder 250 for decoding compressed data generated by an encoder such as the encoder 220, according to an example. The decoder 260 includes an entropy decoder 252, an inverse transform block 254, and a reconstruct block 256. The entropy decoder 252 converts the entropy encoded information in the compressed video, such as compressed quantized transform coefficients, into raw (non-entropy-coded) quantized transform coefficients. The inverse transform block 254 converts the quantized transform coefficients into the residuals. The reconstruct block 256 obtains the predicted block based on the motion vector and adds the residuals to the predicted block to reconstruct the block.

Note that the operations described for FIGS. 2A and 2B only represent a small subset of the operations that encoder and decoders may use.

In various examples, the encoder 220 and/or decoder 250 are implemented within the device 100. In an example, either or both of the encoder 220 and decoder 250 are any of software executing on a processor such as the processor 102 or the APD 116, hardware (e.g., circuitry) such as a processor of any type (e.g., a fixed function analog or digital processor, a programmable processor, a configurable logic array), or any other type of hardware, or a combination of software and hardware. In some examples, the device 100 (e.g., the video system 115) includes an encoder 220, a decoder 250, or both the encoder 220 and decoder 250.

Figure 3:
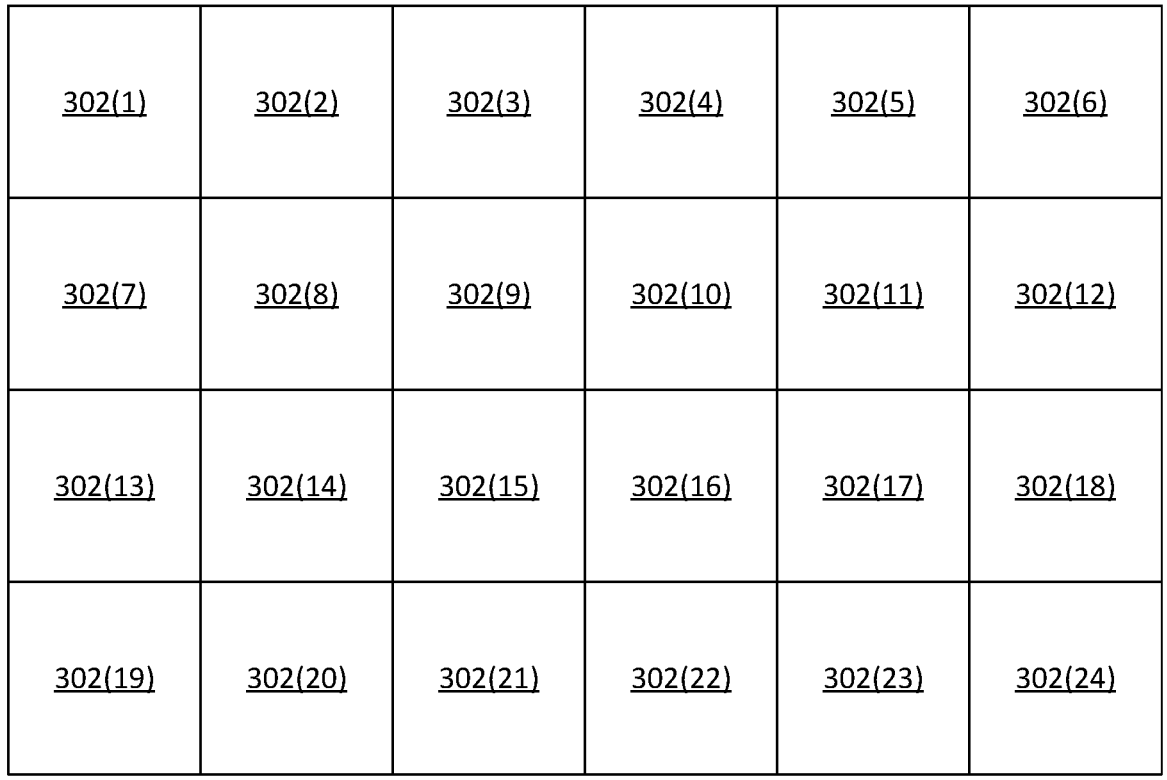
FIG. 3 illustrates a frame being encoded, according to an example.

FIG. 3 illustrates a frame 300 being encoded, according to an example. The frame 300 includes a plurality of blocks 302. The blocks 302 correspond to a rectangular subdivision of the frame, with each block corresponding to a different such portion. In the unencoded data, each block encompasses a plurality of pixels of the unencoded data, where the plurality of pixels fall within the rectangular subdivision. In the encoded data, a block is a set of compressed data that, when uncompressed, results in the set of pixels of the corresponding block in the raw (uncompressed) data.

For the process of encoding, the encoder 220 determines the quantization parameters for each of the blocks 302. Ultimately, this determination affects the amount of data consumed by any particular block 302. In an example, the quantization parameter determines the number of possible values that the coefficients (e.g., discrete cosine transform coefficients) for the transform 226 operation can have. A larger quantization parameter means a greater numerical "spacing" between adjacent coefficient values in the set of possible values, which means that less data is needed to represent the coefficient values but that the fidelity of the information those values record is lower than if a lower quantization parameter is used.

The encoder 220 determines the quantization parameters for the blocks 302 based on a wide variety of factors. Some such factors include rate control factors, content complexity factors, buffer status factors (where the "buffers" are a variety of buffers involved in encoding and which may become full or empty based on the state of encoding), scene change factors, which indicate whether or not a scene change occurs (and thus where more information is needed due to the discontinuity between adjacent frames), feedback from previous frames, such as how much data such frames consume, perceptual considerations, and other factors. In various examples, where multiple such factors are considered, the encoder 220 determines a contribution for each such factor and combines all such contributions to determine the actual QP to be used for a given block 302. In some examples, the pre-encoding analysis block 222 performs pre-encoding analysis on the incoming frame (e.g., on the raw pixel data of the image to be encoded), and also, optionally, uses other factors such as system status and/or information about other frames, to generate information to provide to the encoder 220 to set a QP. Then, during encoding (e.g., processing through prediction 224, transform 226, and entropy encode 228), the encoder 220 determines a QP based on this information as well as other considerations such as rate control. Rate control involves setting the QP in consideration of a data rate—that is, how much data is available for a block 302 and/or frame. In some examples, rate control takes into account a "running data use" or "bit budget" that is available, such that the encoder 220 sets the QP for subsequent blocks 302 to take into account the remaining bit budget for encoding, where "bit budget" means the amount of information that is available for the remaining portions of video (e.g., for the remaining blocks 302 of a frame 300 or the remaining frames 300 in a set of frames).

In an example, the encoder 220 receives information from the pre-encoding analysis 222 and, based on this information, determines a first QP for a first block 302 and a second QP for a second block 302. A bit budget describes how much data a frame is permitted to use for a frame. The encoder 220 keeps track of how much of this bit budget is used up for a given frame and compares the budget for a given block 302 to the budget for that block. The encoder 220 encodes the first block using the first QP and determines that this first block used up too much data. Then the encoder 220 uses rate control to determine a QP for the second block that is higher than the QP that would have been determined if the rate control were not used. It can be seen that the pre-encoding analysis 222 provides information to the encoder 220 that is based on in-depth analysis of video, without necessarily including knowledge about the encoder operations such as rate control, and additional operations in the encoder 220 set the QP based on the based on the operations that actually occur within the encoder 220.

The encoder applies a minimum QP limit to the blocks 302. The minimum QP limit indicates the lowest QP that a block 302 can possibly be assigned. This minimum QP limits the data size of any given block 302. In an example, once the encoder 220 has determined a QP for a block 302, if that value is less than the minimum QP, the encoder 220 sets the value to the minimum QP and if the value is not less than the minimum QP, the encoder 220 does not change the value.

In one example, a processor such as the encoder 220, a driver (e.g., executing in the device 100), or another entity determines the minimum QP. In such examples, the processor determines the minimum QP based on a consideration of the video resolution, a target bitrate, and a frame rate. In some examples, the video resolution defines the number of pixels in a frame of video. In some examples, the target bitrate defines the amount of data per unit of time that is "targeted" for consumption of the video. In some examples, the frame rate is a number of frames per unit of time in the video. In some examples, one or more of these items (video resolution, target bitrate, and frame rate) are provided by an entity (e.g., a software application, hardware device such as a processor, or human user) as input to the encoder 220—in other words, in such examples, the entity that requests that video be encoded also specifies one or more of the above items. In some examples, the encoder 220 sets or modifies one or more of these settings during encoding. In an example, the encoder 220 monitors an available bit budget and adjusts the target bitrate to fit within the available bit budget. In some examples, the encoder 220 also modifies either or both of the resolution and frame rate for the purpose of fitting in the available bit budget.

As stated above, in some examples, the processor (a "minimum QP determination processor", which, again, is any processor capable of making such a determination such as the processor 102, the encoder 220, or any other processor) determines the minimum QP based on a consideration of the video resolution, target bitrate, and frame rate. In various examples, the minimum QP determination processor determines a minimum QP in the following manner: as the video resolution increases, the minimum QP increases; as the target bitrate increases, the minimum QP decreases, and as the frame rate increases, the minimum QP increases. The statement that minimum QP increases as a particular item increases means that for a first value of that item, the minimum QP has a first value and for a second, higher value of that item, the minimum QP has a second value that is higher than the first value. A statement that the minimum QP decreases as a particular item increases means that for a first value of that item, the minimum QP has a first value and for a second, higher value of that item, the minimum QP has a second value that is lower than the first value. In some examples, the minimum QP determination processor determines a complexity factor based on the above items, modifies the complexity factor mathematically based on one or more additional adjustment factors, and limits the result to a range for a final minimum QP value. In some examples, the complexity factor is equal to the resolution divided by (target bitrate/frame rate). In some examples, the additional adjustment factors includes a multiplier applied to the complexity factor to produce a first intermediate result, an offset summed to the first intermediate result to produce a second intermediate result, and a divisor by which the second intermediate result is divided, to produce a tentative final result. In some examples, the minimum QP determination processor limits the tentative final result to a range (minimum-minimum QP and maximum-minimum QP) to produce a final minimum QP. As stated above, the encoder 220 uses this final minimum QP to limit the QPs determined for the blocks of a frame.

In some examples, the minimum QP determination processor determines the minimum QP based on the above in the situation that the pre-encoder block 222 is not enabled or not present. In some examples, in the case that the pre-encoder block 222 is present and enabled, the minimum QP determination processor determines the minimum QP by multiplying the complexity factor by a skip block factor, before using the complexity factor in the remainder of the operations described. In some examples, the skip block factors is the percentage of total blocks in a frame that are estimated to be encoded as skip blocks. A skip block is a block that is encoded with almost no data (e.g., just with an indication that the block is a skip block, or without any transform coefficients, only an indication of which reference block in the same frame or a different block to "reuse" for the block being encoded). In some examples, the pre-encoder block 222 performs this estimate by predicting, for each block in a frame, whether that block will be encoded as a skip block. In some examples, the pre-encoder block 222 predicts that a block will be encoded as a skip block in the event that either the number of different pixels in the block is less than a pre-defined threshold or that the sum of absolute differences between the block and the co-located block in the last frame is smaller than a threshold. If either of these is true, then the pre-encoder block 222 determines that the block is a skip block and if none of these is true, then the pre-encoder block 222 determines that the block is not a skip block. The minimum QP determination processor performs this for all blocks of a frame and divides the number of blocks predicted to be encoded as skip blocks by the total number of blocks to obtain the skip block factor. Again, the minimum QP determination processor multiplies the skip block factor by the complexity factor and optionally performs other operations as described above to obtain a minimum QP. In summary, in the instance that pre-encoding analysis is enabled, the minimum QP determination processor determines the minimum QP based on the complexity factor modified by the skip block factor.

In an example, a formula for determining the minimum QP is as follows:

$$minQP = \frac{cpxf * c_1 + c_2}{c_3}$$

In the above, minQP is the complexity factor and ci through cs are constants that can be any value. In some examples, the complexity factor is defined as:

$$cpxf = \frac{resolution}{\left(\frac{target\ bitrate}{frame\ rate}\right)}$$

In the example in which pre-encoding analysis is enabled, the cpxf is further multiplied by the skip block factor:

$$cpxf = \frac{resolution * skip\ block\ factor}{\left(\frac{target\ bitrate}{frame\ rate}\right)}$$

Figure 4:
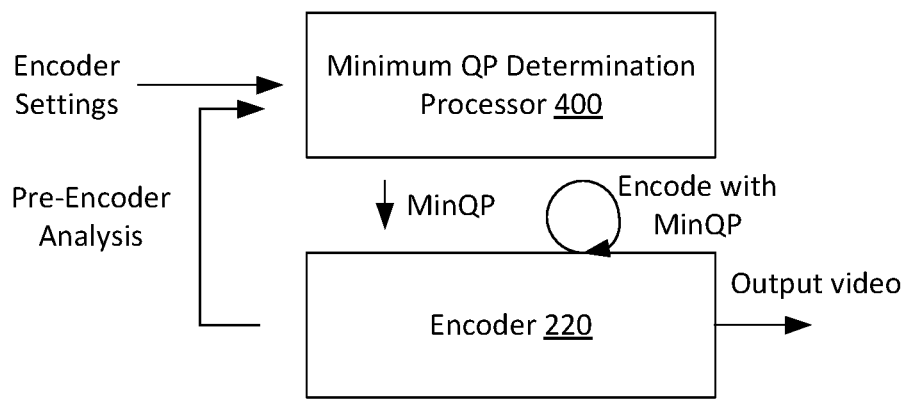
FIG. 4 illustrates processing flow associated with minimum QP, according to an example.

FIG. 4 illustrates processing flow associated with minimum QP, according to an example. A minimum QP determination processor 400 and an encoder 220 are shown. The minimum QP determination processor 400 includes any technically feasible processor such as the processor 102, the encoder 220, or any other processor. Note, although shown as separate, it is possible for the minimum QP determination processor 400 to be part of the encoder 220.

Figure 5:
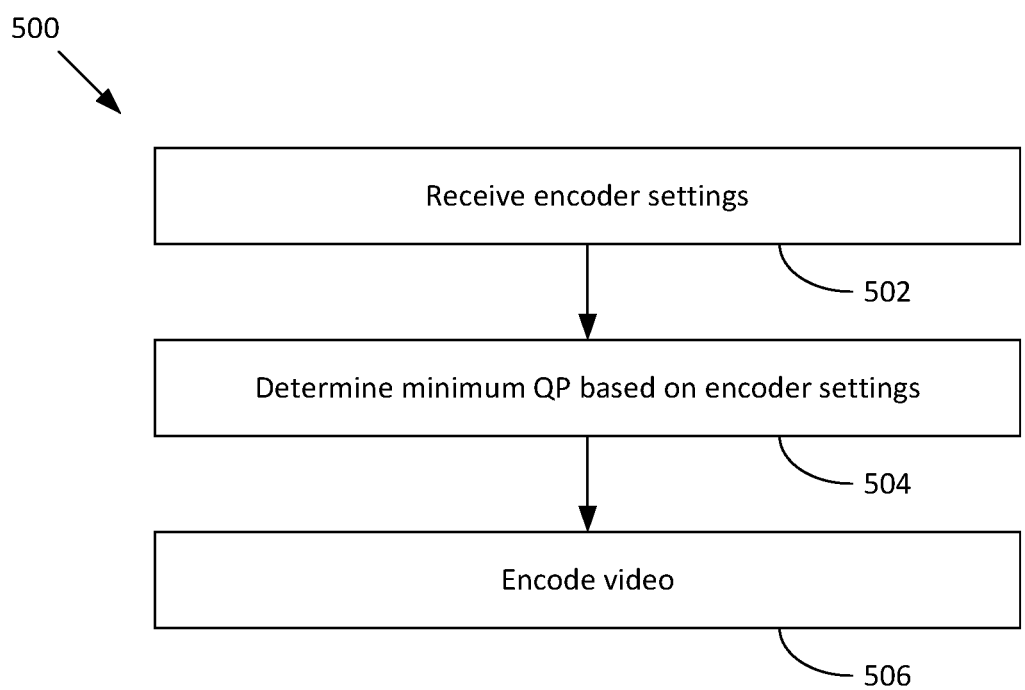
FIG. 5 is a flow diagram of a method for performing processing associated with minimum QP, according to an example.

FIG. 5 is a flow diagram of a method 500 for performing processing associated with minimum QP, according to an example. Although described with respect to the system of FIGS. 1-4, those of skill in the art will recognize that any system configured to perform the steps of the method 500 in any technically feasible order falls within the scope of the present disclosure. FIGS. 4 and 5 will now be discussed together.

At step 502, the minimum QP determination processor 400 receives encoder settings. This is reflected in FIG. 4 with the minimum QP determination processor receiving the encoder settings. In various examples, the encoder settings include the resolution, target bitrate, and frame rate, as discussed elsewhere herein. In various examples, the minimum QP determination processor 400 receives these settings from the encoder 220 or from software such as an application 120 or driver that requests the encoding to be performed.

At step 504, the minimum QP determination processor 400 determines a minimum QP based on the encoder settings. The specifics of how this is done are described elsewhere herein. This operation is reflected in FIG. 4, with the minimum QP determination processor 400 determining the minimum QP. Note that, as described elsewhere herein, in some instances (e.g., where pre-encoding analysis is enabled), the minimum QP determination processor 400 considers a skip block factor as well in determining the minimum QP.

At step 506, the encoder 220 encodes the video using the minimum QP. This operation is reflected in FIG. 4, with the encoder 220 encoding with minimum QP and outputting the video. Encoding using the minimum QP means, for the purpose of determining QP for blocks to be encoded, if the encoder 220 determines a QP that is lower than the minimum QP for that block, then the encoder 220 uses the minimum QP as the QP for that block instead.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, the storage 108, interconnect 112, encoder 220, including pre-encoding analysis 222, prediction 224, transform 226, and entropy encode 228, and decoder 250, include entropy decode 252, inverse transform 254, and reconstruct 256, as well as the minimum QP determination processor 400, are implemented fully in hardware, fully in software executing on processing units, or as a combination thereof. In various examples, any of the hardware described herein includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
   identifying encoder settings;
   determining a minimum quantization parameter ("QP") for a frame based on the encoder settings; and
   encoding the frame based on the minimum QP.

2. The method of claim 1, wherein the encoder settings include one or more of resolution, target bitrate, or frame rate.

3. The method of claim 2, wherein determining the minimum QP based on the encoder setting comprises an operation in which the minimum QP increases as the resolution increases.

4. The method of claim 2, wherein determining the minimum QP based on the encoder setting comprises an operation in which the minimum QP decreases as the target bitrate increases.

5. The method of claim 2, wherein determining the minimum QP based on the encoder setting comprises an operation in which the minimum QP increases as the frame rate increases.

6. The method of claim 2, wherein determining the minimum QP is based on a complexity factor that equals the resolution divided by the target bitrate divided by the frame rate.

7. The method of claim 6, wherein determining the minimum QP is further base on an estimated skip block percentage.

8. The method of claim 7, wherein the skip block percentage includes a percentage of blocks of the frame predicted to be encoded as skip blocks.

9. The method of claim 1, wherein encoding the frame using the minimum QP includes limiting the QP for all blocks of the frame to the minimum QP.

10. A system comprising:
    a memory configured to store information for a frame; and
    a processor configured to:
      identify encoder settings;
      determine a minimum quantization parameter ("QP") for the frame based on the encoder settings; and
      encode the frame based on the minimum QP.

11. The system of claim 10, wherein the encoder settings include one or more of resolution, target bitrate, or frame rate.

12. The system of claim 11, wherein determining the minimum QP based on the encoder setting comprises an operation in which the minimum QP increases as the resolution increases.

13. The system of claim 11, wherein determining the minimum QP based on the encoder setting comprises an operation in which the minimum QP decreases as the target bitrate increases.

14. The system of claim 11, wherein determining the minimum QP based on the encoder setting comprises an operation in which the minimum QP increases as the frame rate increases.

15. The system of claim 11, wherein determining the minimum QP is based on a complexity factor that equals the resolution divided by the target bitrate divided by the frame rate.

16. The system of claim 15, wherein determining the minimum QP is further base on an estimated skip block percentage.

17. The system of claim 16, wherein the skip block percentage includes a percentage of blocks of the frame predicted to be encoded as skip blocks.

18. The system of claim 10, wherein encoding the frame using the minimum QP includes limiting the QP for all blocks of the frame to the minimum QP.

19. A non-transitory computer-readable medium storing instructions that, when executed by a processor, cause the processor to perform operations comprising:
    identifying encoder settings;
    determining a minimum quantization parameter ("QP") for a frame based on the encoder settings; and
    encoding the frame based on the minimum QP.

20. The non-transitory computer-readable medium of claim 19, wherein the encoder settings include one or more of resolution, target bitrate, or frame rate.

* * * * *